United States Patent [19]

Davis

[11] 4,017,326

[45] Apr. 12, 1977

[54] ENHANCEMENT OF IRIDESCENT COLORS TO PROVIDE VIVID RECORDING COLORS

[76] Inventor: Chester Davis, 1685 Atson Lane, Cincinnati, Ohio 45205

[22] Filed: Jan. 16, 1976

[21] Appl. No.: 649,689

Related U.S. Application Data

[60] Division of Ser. No. 549,707, Feb. 13, 1975, and a continuation of Ser. No. 549,706, Feb. 13, 1975.

[52] U.S. Cl. .............................. 106/291; 427/214; 427/336; 428/324; 428/404; 428/363
[51] Int. Cl.$^2$ .......................................... C09C 1/28
[58] Field of Search .......... 106/291, 300; 428/324, 428/363, 458, 404; 427/336, 214

[56] References Cited

UNITED STATES PATENTS

| | | | |
|---|---|---|---|
| 3,311,485 | 3/1967 | Duwell | 106/291 |
| 3,481,663 | 12/1969 | Greenstein | 428/324 |

*Primary Examiner*—Winston A. Douglas
*Assistant Examiner*—J. V. Howard
*Attorney, Agent, or Firm*—Wood, Herron & Evans

[57] ABSTRACT

Iridescent pigments, of the type which comprise colorless micaceous substrates having thereon at least one overcoating of an essentially transparent material with a refractive index over about 2.0, can be enhanced in coloration by applying to them a solution of a coloring matter which possesses an absorption band complementary to the interference reflection color of the pigment, and which thereby absorbs that complementary color. The resulting vivid intensity of the iridescent coloration is far out of proportion to the concentration of the coloring matter and to the intensity of the absorption band. The enhanced colors are useful in novel colorants, printing inks, recording systems, and copy papers.

4 Claims, No Drawings

ENHANCEMENT OF IRIDESCENT COLORS TO PROVIDE VIVID RECORDING COLORS

This application is a division of application Ser. No. 549,707, filed Feb. 13, 1975, and is related to my copending application Ser. No. 549,706, filed Feb. 13, 1975, titled "Recording Sheet For Forming Intensely Colored Iridescent Indicia."

This invention relates to a simple method for enhancing the weak colors displayed by certain iridescent pigments, so as to provide more vivid colors which are useful in printing, copying, and recording systems. This invention further relates to a novel method for recording indicia by means of iridescent colors. This invention still further relates to a novel method for forming intensely colored indicia from weakly colored recording fluids. This invention still further relates to a new series of novel printing inks.

In recent years there has appeared a new type of nacreous pigment which exhibits a weak iridescence when dispersed in liquid. These pigments are known commercially as "iridescent pigments." From an optics viewpoint, they comprise a base substrate of essentially transparent (colorless) plate-like particles, with at least one overcoating of an essentially transparent material having a refractive index greater than that of the base substrate. They are prepared commercially by overcoating a micaceous substrate with an extremely thin film of a material such as titanium dioxide or zirconium dioxide, having a refractive index which is substantially higher than that of the base substrate and which is usually greater than about 2.0. Such pigments are disclosed in U.S. Pat. Nos. 3,071,482 and 3,087,828 and are available from Mearl Corp., 41 East 42nd St., New York, N.Y. 10017, under the name "Flamenco Nacreous Pigments."

In the course of another investigation, the present applicant examined these iridescent pigments for possible use in a recording paper. They displayed very weak colors which gave almost no contrast with normal backgrounds and, therefore, they had no practical value for that purpose. As graphite is strongly colored and has a plate-like structure similar to mica, an attempt was made to deposit an iridescent interference layer, the so-called Nobili rings, on graphite flakes, but the Nobili process did not work on graphite. (The Nobili rings and process are discussed in David Fishlock, *Metal Colouring*, Robert Draper, Ltd., Teddington, 1962.)

To examine what a coated graphite pigment displaying iridescent properties might look like, the applicant mixed graphite with Iridescent Blue Pigment (i.e., a titanium dioxide coated mica which displays a blue interference reflection color), treated the mixture with a colorless ("white") mineral oil until the surfaces of the mixture were covered with a very thin film of oil, then firmly compressed the mixture of particles into intimate contact. The resultant film immediately displayed an intense blue iridescent color. This coloration was totally unexpected and was at that time unexplainable, for the standard pigment technology, a black material mixed with a white material should give only a shade of gray, never a deep blue color.

The nature of this deep blue iridescent color was puzzling. One possible explanation was that the light absorbed by the graphite was being "pumped" into the iridescent pigment and emitted as blue light. This explanation proved to be invalid, in that exposure of the blue film to ultra-violet light absorbed by graphite did not cause a blue emission from the film. An attempt was then made to determine what effect solutions of solvent-soluble dyes would have on these iridescent pigments. These solvent-soluble dyes included oil-soluble dyes, water-soluble dyes, and spirit-soluble dyes.

When Iridescent Blue Pigment was treated with a black Nigrosine Black Oleate solution in hydrocarbon solvent, an intense blue iridescent color was immediately displayed. With Iridescent Green Pigment (i.e., a titanium dioxide coated mica which displays a green interference reflection color) and black dye solution, an intense green iridescent color was displayed. With Iridescent Red Pigment (i.e., a titanium dioxide coated mica which displays a red interference reflection color) and black dye solution, an intense red iridescent color was displayed. With Iridescent Yellow Pigment (i.e., a titanium dioxide coated mica which displays a yellow interference reflection color) and black dye solution, a golden yellow iridescent color was displayed.

After considerable experimentation, the conclusion was reached that in iridescent pigments of the type that is made by overcoating an essentially transparent (white in air but transparent or colorless when immersed in a vehicle of approximately the same refractive index) micaceous substrate with a very thin layer of a material having a refractive index substantially higher than mica's (the index of refraction of mica is 1.560), there is potentially available a much greater intensity interference color than is normally obtained. (For a discussion of the phenomenon of interference reflection, see P. Baumeister and G. Pincus, "Optical Interference Coatings", pages 58–75, *Scientific American* for December, 1970.)

In normal practice, while one wavelength of light (the interference reflection color) is strengthened by interference reflection from the first overcoating layer (the optical interference coating) on an iridescent pigment, those wavelengths of light which are transmitted through the essentially transparent iridescent pigment to its opposite surface are then refracted and reflected back to the observer's eye, with the result that the total reflected (observed) beam of light is almost identical with the original incident beam.

In other words, the observed intensity of the reflected interference color is markedly diminished because it is still mixed with other portions of the original "white light" beam. For example, in the case of the Iridescent Blue Pigment, the blue wave band is reinforced and reflected back from the first overcoating layer (the optical interference coating) and the red and yellow wave bands are transmitted through this overcoating, through the inner portions of the essentially transparent pigment to the pigment's opposite surface, whereupon these red and yellow wave bands are refracted and reflected back to the observer to give an almost complete reflection of the original white light spectrum.

The observed interference reflection wave band is, however, markedly enhanced if wavelengths complementary to it are absorbed and removed to some degree by a colored film. The film absorbs some or all of these complementary wavelengths which have been transmitted through the iridescent pigment's optical interference coating and which normally would be refracted and reflected back to the observer from the pigment's surface. (In optics, one wavelength is complementary to another when their mixture is a light beam gives an impression of white or gray.)

For example, a blue interference reflection color is enhanced when red wavelengths (which are complementary to blue) are absorbed by a red absorptive film (such as Nigrosine Black solution of Sudan Blue solution) on the iridescent pigment's outer surface. The film does not undesirably absorb the interference-reinforced wave band which is reflected back from the optical interference coating. Those dyes which absorb wavelengths complementary to the interference reflection color of an iridescent pigment function, it is theorized, by wholly or at least partially removing competing wavelengths which are refracted through the pigment surface, and they thereby reveal (uncover) the actually intense but normally obscured interference reflection color of the iridescent pigment. The absorption bands for the more common solvent-soluble dyes are set forth in the literature; whether any given dye has a suitable absorption band, for use with a given reflection color, can easily be determined by simple testing.

This explanation was found to agree with the experimental observation that a pure red dye did not enhance the blue interference reflection color of Iridescent Blue Pigment, nor did a pure blue dye enhance the red interference reflection color of Iridescent Red Pigment. Black dyes, which show some absorption of all wavelengths of visible light, gave enhancement of all primary color iridescent pigments. Green dyes and blue-green dyes gave enhancement of both the green interference reflection color of Iridescent Green Pigment and the blue interference reflection color of Iridescent Blue Pigment but did not give enhancement of the red interference reflection color of Iridescent Red Pigment. The available evidence indicates that the mechanism of the enhancement of iridescent interference colors by colored fluids is due to absorption at the pigment's surface of some or all of the wavelengths complementary to that of the iridescent pigments's interference reflection color.

One interesting discovery made in the course of this investigation was that the ordinary color of the dye does not dominate the color displayed by the iridescent pigment; thus, a solution of a green dye which gives enhancement of the interference color of an Iridescent Blue Pigment results in a situation wherein a pale green dye solution may give a deep blue print during a recording operation. Furthermore, one colored (black) solution may give a deep blue, an intense green, a deep red, or a golden yellow print, depending on the iridescent pigment layer contacted with this solution. This is of considerable importance in color photography and color printing which now require different dyes to give different colors. Other unusual applications of the present discovery are in the field of novel recording systems and copying systems.

For example, a red-violet dye, unlike a pure red dye, may give enhancement of both the blue interference reflection color of Iridescent Blue Pigment and enhancement of the red reflection color of the Iridescent Red Pigment, whereas a pure red dye gives enhancement only of the red reflection color of the Iridescent Red Pigment. This effect is important, for it makes possible the attainment of pure color shades from off-color printing fluids and inks. This is of special value to color printing applications where pure colors are not always easy to obtain under certain developing and printing conditions. As previously stated, with the present discovery it is possible to obtain all four of the important primary colors (red, green, blue, and yellow) from one dye structure alone in combination with four white pigments. This is a result which cannot be achieved by any other means at the present time.

It has been found that the enhanced colors obtained by the use of oil-soluble dyes on iridescent pigments are markedly more light-stable than the colored solutions themselves. In some cases, the enhanced iridescent colors were little faded after eight weeks exposure to sunlight under glass, whereas the colored solutions themselves were completely bleached out after 2 weeks exposure to sunlight under glass. The light-stability of spirit-soluble dye-pigment combinations and water-soluble dye-pigment combinations are also markedly increased, but not to the same extent attained with oil-soluble (water-insoluble) dyes. The increased light-stability of the dye-pigment combinations appears to be due to protection of the dye molecule by the iridescent pigment, possibly through thermal deactivation of the photo-activated dye molecule. Regardless of the actual mechanism by which this is achieved, the print obtained from the dye-enhanced iridescent pigment combination is far more light stable than the dye itself. This is advantageous in office printing and photo-copying, for a stable print may be obtained from a somewhat fugitive dye.

The markedly enhanced iridescent interference colors available through the present discovery make possible the use of iridescent pigments in photographic papers, in business copying systems, and in specialty printing applications requiring unusual color systems. The resultant colors are intense, light-stable, and resistant to atmospheric degradation.

Because the iridescent pigments used in the present invention are now in limited production as specialty materials, they are presently somewhat high priced (for example, although mica itself sells for 5 cents per pound, one group of titanium dioxide-coated micas sells presently for $8.50 per pound as a specialty cosmetic product), but they are still considerably cheaper than certain color-forming dyes used in business copying systems which sell for $10 and $15 or more per pound. Nevertheless, an attempt was made to determine if these iridescent pigments could be used as admixtures with cheaper materials without destroying their advantageous features. However, mixtures of the iridescent pigments with titanium dioxide and with zinc sulfide were found to be worthless for this purpose because small amounts of these high refractive index (over 2.0) materials markedly dampen the iridescent colors.

Solid materials having a refractive index less than approximately 1.8, however, were found to give admixtures with iridescent pigments which did not dampen the iridescent reflection color when up to roughly about 75% of diluent was added. Over about 75% by weight of diluent gave admixtures with markedly diminished iridescence. The best results were obtained at 50% by weight of iridescent pigment to 50% by weight of diluent, at which concentrations only slight diminishment of iridescent intensity occurs. Depending on the applications involved, up to 75% of diluent to iridescent pigment gives worthwhile results.

The importance of this discovery is readily seen when it is realized that the use of a diluent material costing pennies per pound (mica, talc, clay, etc.) enables a materials cost reduction of over 50% and permits the expansion of applications of iridescent pigments to areas wherein the present costs of pure pigment systems would be non-competitive. A 50—50 mixture of five cents per pound diluent and $8.50 per pound iridescent pigment represents a coating pigment cost of $4.30 per pound. At the present time, for example, no colorless dye material can be manufactured anywhere near that price. As the selling prices of iridescent pigments are brought down by large-scale commercial production, a 50—50 mixture could rapidly drop to $1.00 to $2.00 per pound, at which price levels few organic colors are competitive.

Because the nacreous iridescent pigments used in the present invention are white, finely divided, free-flowing powders in the dry state, they can be used to obscure the colors of finely divided dye particles when up to approximately 5% by weight of dye particles are present. For example, a mixture composed of 99% by weight of Iridescent Blue Pigment and 1% by weight of undissolved but oil-soluble dye such as Sudan Blue CSP (GAF Corp.) appears white or cream-colored because the eye detects only the "mass color" of the mixture, which is white. However, when the mixture is treated with a solvent for the dye (Diisooctyl Phthalate, Tricresyl Phosphate, etc.), the dye spreads over the pigment surface as a colored solution to yield an intensely colored pigment-dye system with excellent "covering power". This is a novel method for obtaining color from a colorless system.

The commercial value of the present discovery, then, is that it enables the replacement of expensive dyes and colorformers by a less expensive dye-pigment system of greater intensity, greater light-stability, and greater versatility. The system of the present invention is of special value in printing and recording papers, which are more fully disclosed in my above identified copending application, "Recording Sheet For Forming Intensely Colored Iridescent Indicia."

The following examples illustrate but do not limit the application of the principles of this invention.

EXAMPLE 1

A sample of Iridescent Blue Pigment (one exhibiting a blue interference reflection color) was treated with a dilute solution of Nigrosine Black Oleate in oleic acid-mineral oil, by contacting the pigment surface with sufficient liquid to wet the pigment particles and coat them with an extremely thin colored film. An intense blue iridescent color developed immediately. This sample was then spread onto a paper base and exposed to sunlight. A thin film of Nigrosine Black Oleate solution was completely bleached by sunlight within 2 weeks; the intense blue iridescent color was unaltered after 4 weeks and had faded only slightly after 8 weeks of exposure to sunlight.

The dye concentrations used here are not critical, because the enhancement of the iridescent color is out of proportion to the amount of dye present. Concentrations from about 0.05 to 10% dye can be used, depending on what dye is used for the enhancement. For commercial work, concentrations of about 1 to 3% are most useful. Excess solution is to be avoided as wasteful; all that is required is that the pigment surface be covered with an extremely thin colored film of dye solution. The effect obtained herein is a physical effect, not a chemical one.

EXAMPLE 2

A sample of Iridescent Blue Pigment was treated with a dilute solution of Amasolve Blue OR in Dioctyl Phthalate. An intense blue iridescent color developed immediately. This sample was then spread onto a paper base and exposed to sunlight under glass. A thin film of Amasolve Blue OR was bleached by sunlight in 2 weeks, but the intense blue iridescent color was faded only slightly after 8 weeks exposure to sunlight.

EXAMPLE 3

A sample of Iridescent Red Pigment was treated with a dilute solution of Nigrosine Black Oleate on oleic acid-mineral oil. An intense red iridescent color developed immediately. This sample was spread onto a paper base and exposed to sunlight under glass. A thin film of Nigrosine Black Oleate was bleached by sunlight within 2 weeks. The intense red iridescent color was unaltered after 4 weeks and had faded only slightly after 8 weeks exposure to sunlight.

EXAMPLE 4

A sample of Iridescent Red Pigment was treated with a dilute solution of Amasolve Violet R in Diisooctyl Phthalate. An intense red iridescent color developed immediately. This sample was spread onto a paper base and exposed to sunlight under glass. A thin film of Amasolve Violet R was bleached within 2 weeks but the intense red iridescent color had faded only slightly after 8 weeks exposure to sunlight.

EXAMPLE 5

A sample of Iridescent Green Pigment was treated with a dilute solution of Amasolve Blue OR in Tricresyl Phosphate. A very intense green iridescent color developed immediately. This sample was spread onto a paper base and exposed to sunlight under glass. A thin film of Amasolve Blue OR was bleached within 2 weeks, but the green iridescent color was faded only slightly after 8 weeks exposure to sunlight.

EXAMPLE 6

A sample of Iridescent Yellow Pigment was treated with a dilute solution of Nigrosine Black Oleate in oleic acid-mineral oil. An intense golden yellow color developed immediately. This sample was spread onto a paper base and exposed to sunlight under glass. A thin film of Nigrosine Black Oleate was bleached within 2 weeks, but the yellow iridescent color was faded only slightly after 8 weeks exposure to sunlight.

EXAMPLE 7

A sample of Iridescent Blue Pigment was mixed with an equal weight of graphite and was wetted with mineral oil. The wet mixture was firmly compressed into a thin film on a paper base. An intense blue iridescent color developed immediately. This film was exposed to sunlight under glass for 6 months; no detectable fading had occurred by the end of 6 months. A similar film was exposed outdoors to direct summer sunlight for 3 months; no detectable fading had occurred by the end of 3 months.

EXAMPLE 8

Samples of Iridescent Blue Pigment were mixed with accurately weighed amounts of finely divided silica as diluent to give various proportions of silica diluent to iridescent pigment:

75% pigment — 25% silica
66% pigment — 34% silica
50% pigment — 50% silica
34% pigment — 66% silica
25% pigment — 75% silica
15% pigment — 85% silica The samples were treated with a dilute solution of Nigrosine Black Oleate in oleic acid-mineral oil. Thin films of the resultant iridescent color were compared for color intensity and opacity with a thin film of 100% Iridescent Blue Pigment, which was also treated with Nigrosine Black Oleate solution. The 75% pigment — 25% silica mixture was as intense as the 100% pigment film. The 66% pigment mixture was as intense as the 100% pigment film. The 50% pigment mixture was essentially as intense as the 100% pigment film. The 34% pigment mixture film was slightly less intense than the 50—50 mixture film. The 25% pigment film was not as intense as the 34% pigment mixture film but still had noticeable iridescent color enhancement. Below 25% pigment concentration, the diluent detracts from the pigment's iridescent enhancement to an unsatisfactory level.

Similar experiments were run using as diluents: mica, talc, pumice, calcium carbonate, magnesium carbonate (refractive index=1.700), kaolin clay, attapulgite clay, aluminum oxide, diatomaceous silica, finely divided cellulose fibers, magnesium silicate and other mineral silicates, Fuller's Earth, calcium sulfate, and other essentially transparent, water insoluble solid diluents possessing a refractive index below about 1.8. All such diluents show similar results: the 50—50 mixtures were essentially as good as the 100% iridescent pigment systems, but below 25% pigment, the diluent detracts from the pigment's iridescent enhancement to an unsatisfactory level.

Similar experiments were made with the Iridescent Red Pigment and the Iridescent Green Pigment, and similar results were obtained: the 50—50 mixtures were essentially as intense as the 100% pigment films, and 25% pigment to 75% diluent films still exhibit iridescent color enhancement. Below roughly about 25% pigment concentrations, iridescent color intensity falls off rapidly. The diluents used are all water-insoluble solid materials which are white in air but are essentially transparent when immersed in a liquid with a refractive index in the normally encountered range (1.3–1.7).

EXAMPLE 9

A sample of Iridescent Blue Pigment was thoroughly mixed with an equal weight of finely divided mica, and the mixture was treated with a dilute solution of Amasolve Blue in acetone. An intense blue color developed immediately. After the acetone had evaporated, the dry iridescent color was mixed with boiled linseed oil to form a slow-drying paint. This paint was brushed onto a wood base and exposed to sunlight under glass. The resultant paint film showed no fading or discoloration after 8 weeks exposure to sunlight.

EXAMPLE 10

A sample of Iridescent Blue Pigment was thoroughly mixed with an equal weight of finely divided amorphous silica and treated with a dilute solution of Nigrosine Black Oleate in a volatile hydrocarbon solvent. An intense iridescent blue color developed immediately. After the hydrocarbon solvent had evaporated, the intense blue pigment was mixed with warm, boiled linseed oil containing a little rosin to form a printing ink. The resultant ink gave intense blue iridescent indicia on paper, metal films, and plastic films.

EXAMPLE 11

A sample of Iridescent Green Pigment was treated with an aqueous solution of Brilliant Green Dye. A very intense green iridescent color developed immediately. After the water was removed by evaporation, the dry green iridescent pigment was mixed with warm, boiled linseed oil containing a little rosin to form a printing ink. The resultant ink gave intense green iridescent indicia on paper which were markedly more vivid than the green inks used on United States currency.

EXAMPLE 12

A sample of Iridescent Red Pigment was treated with an aqueous solution of a water-soluble azo red dye. An intense red iridescent color developed immediately. After the water was removed by evaporation, the dry red pigment was mixed with mineral oil to form a simple printing ink. This ink gave intense red iridescent indicia on paper. The light stability of the print was satisfactory but not as good as the light-stability of the print made from a printing ink that used as a red pigment a sample of Iridescent Red Pigment treated with an oil-soluble dye such as Sudan Red.

EXAMPLE 13

A sample of Iridescent Blue Pigment was thoroughly mixed with 25% by weight of very fine white pumice and treated with a DIOP solution of Amasolve Blue OR. An intense blue iridescent color developed immediately. To this was added a warm solution of rosin in boiled linseed oil to form a printing ink. The resultant ink gave intense blue iridescent indicia on paper, metal films, and plastic films. These prints had good light-stability.

EXAMPLE 14

A sample of Iridescent Green Pigment was thoroughly mixed with 25% by weight of kaolin clay and treated with a solution of Amasolve Black FPE in DIOP. An intense green iridescent color developed immediately. To this was added a warm solution of rosin in boiled linseed oil to form a printing ink. The resultant ink gave intense green iridescent prints on paper which were markedly move vivid than the green inks used on United States currency.

EXAMPLE 15

A sample of Iridescent Blue Pigment was thoroughly mixed with 1% by weight of finely divided Sudan Blue dye (GAF Corp.). The resultant powder was white ("cream" colored) and gave a thin white film on paper. (The mixture was mixed with an aqueous 5% cornstarch dispersion and coated onto a standard paper base web, then air-dried.) Treatment with diisooctyl phthalate gave an intense iridescent blue print. Similar essentially white mixtures were given with Iridescent Blue Pigment and fine divided Amasolve Blue and with finely divided Amasolve Black, as well as other finely divided dyes. The essentially white mixtures were mixed with an aqueous 5% cornstarch dispersion, coated onto a standard paper base web, then air-dried to give a white film. Treatment with a liquid which was a solvent for the dye gave a colored solution which spread over the pigment's surface to give an intense iridescent blue color against a white background.

EXAMPLE 16

A sample of Iridescent Red Pigment was thoroughly mixed with 2% by weight of finely divided Sudan Red dye (GAF Corp.). The resultant powder was white with a faint pink sheen and gave an essentially white film on paper upon being coated as an aqueous dispersion using a cornstarch binder. Treatment with tricresyl phosphate gave an intense iridescent red color. Similar substantially white mixtures were given with Iridescent Red Pigment and finely divided Amasolve Violet and with finely divided Amasolve Black, as well as other finely divided dyes. Treatment with a liquid which was a solvent for the dye gave a colored solution which spread over the pigment's surface to give an intense iridescent red color against a white background.

EXAMPLE 17

A sample of Iridescent Green Pigment was thoroughly mixed with 1% by weight of finely divided Amasolve Blue dye to give a cream colored powder with a faint green sheen. The resultant powder gave an essentially white film on paper upon being coated as an aqueous dispersion using a cornstarch binder. Treatment with tricresyl phosphate gave an intense iridescent green color against a white background. Similar results were obtained when Iridescent Green Pigment was mixed with finely divided Amasolve Black, as well as other finely divided dyes.

EXAMPLE 18

A mixture of 5 grams of Iridescent Blue Pigment and 5 grams of finely divided silica were thoroughly dispersed in 50 grams of warm water containing 2 grams of gelatin dissolved therein. The coating composition was coated onto a standard paper base web with a coating rod and air-dried. Treatment with Amasolve Black in DIOP gave an intense iridescent blue print which was essentially identical with the print made on a thin film on paper of 100% Iridescent Blue Pigment.

EXAMPLE 19

One gram of Iridescent Green Pigment was dispersed in 10 grams of water containing 0.3 gram gelled and dispersed cornstarch. This coating composition was coated onto a standard paper base web and air-dried to give a white film on paper. Treatment with Amasolve Blue OR in tricresyl phosphate gave an intense green iridescent print on a white background. Treatment with Amasolve Black FPE in diisooctyl phthalate gave an intense green iridescent print on a white background.

It should be clearly understood that my invention is not limited to the examples set forth but is applicable to a wide variety of printing and recording vehicles and systems. The enhancement of iridescent colors may be used to form multi-colored prints using only one coloring material with different pigment layers. The enhancement of iridescent colors may be used to substitute a blue-green dye or a red-violet dye for a blue dye and still yield a blue print on the appropriate surface. Other applications will be obvious to those skilled in the art, from the preceding specification.

Having described my invention, I claim:
1. A composition of matter which comprises
   an iridescent pigment of the type comprising an essentially transparent micaceous substrate having thereon at least one overcoating of an essentially transparent material having a refractive index greater than about 2.0,
   and discrete finely divided particles of a diluent which is a water-insoluble, essentially transparent solid having a refractive index less than about 1.8,
   the particles of said diluent comprising up to about 75% of the weight of said composition,
   the diluent particles being admixed among the pigment.
2. A composition of matter which comprises a mixture of
   an iridescent pigment of the type comprising an essentially transparent micaceous substrate having thereon at least one overcoating of an essentially transparent material having a refractive index greater than about 2.0, and
   finely divided particles of an oil-soluble dye having an absorption band complementary to the interference reflection color of the iridescent pigment,
   said dye comprising up to about 5% of the weight of said mixture.
3. A composition of matter which comprises
   an iridescent pigment of the type comprising an essentially transparent plate-like base substrate having thereon at least one overcoating of an essentially transparent material having a refractive index which is substantially greater than that of said base substrate,
   and discrete, finely divided particles of a diluent which is a water-insoluble, essentially transparent solid having a refractive index less than approximately 1.8,
   the particles of said diluent comprising up to about 75% of the weight of said composition,
   the diluent particles being admixed among the pigment.
4. A composition of matter which comprises a mixture of
   an iridescent pigment of the type comprising an essentially transparent plate-like base substrate having thereon at least one overcoating of an essentially transparent material having a refractive index which is substantially greater than that of said base substrate,
   and finely divided particles of an oil-soluble dye which possesses an absorption band complementary to the interference reflection color of said iridescent pigment,
   said dye comprising up to about 5% of the weight of said mixture.

* * * * *